(12) United States Patent
Roundell

(10) Patent No.: US 7,471,023 B2
(45) Date of Patent: Dec. 30, 2008

(54) ELECTRIC MACHINE PROVIDED WITH AN INTERNAL STATOR

(75) Inventor: Jane Roundell, Saint-Lambert (CA)

(73) Assignee: TM4 Inc., Boucherville, Quebec (CA)

( * ) Notice: Subject to any disclaimer, the term of this patent is extended or adjusted under 35 U.S.C. 154(b) by 355 days.

(21) Appl. No.: 11/463,674

(22) Filed: Aug. 10, 2006

(65) Prior Publication Data

US 2007/0052305 A1    Mar. 8, 2007

Related U.S. Application Data

(60) Provisional application No. 60/706,781, filed on Aug. 10, 2005.

(51) Int. Cl.
*H02K 5/00* (2006.01)
(52) U.S. Cl. .......................... 310/91; 310/52; 310/254
(58) Field of Classification Search ............. 310/52–59, 310/64, 89–91, 254, 261
See application file for complete search history.

(56) References Cited

U.S. PATENT DOCUMENTS

| | | | | |
|---|---|---|---|---|
| 4,710,664 A * | 12/1987 | Cox et al. | ................... | 310/217 |
| 4,814,651 A * | 3/1989 | Elris et al. | ..................... | 310/88 |
| 6,114,784 A * | 9/2000 | Nakano | ....................... | 310/59 |
| 6,633,097 B2 * | 10/2003 | Dunlap et al. | ................. | 310/54 |
| 6,703,738 B2 * | 3/2004 | Yoshikawa et al. | ............ | 310/91 |
| 6,819,016 B2 | 11/2004 | Houle et al. | | |
| 6,960,851 B2 | 11/2005 | Poulin et al. | | |
| 6,979,919 B2 * | 12/2005 | Gotmalm | ..................... | 310/54 |
| 2002/0145348 A1 * | 10/2002 | Anma | ......................... | 310/91 |
| 2004/0227415 A1 | 11/2004 | Gotmalm | | |

OTHER PUBLICATIONS

PCT International Search Report regarding PCT/CA2006/001224.

* cited by examiner

*Primary Examiner*—Thanh Lam
(74) *Attorney, Agent, or Firm*—Quarles & Brady, LLC

(57) ABSTRACT

An electric machine is described herein. The machine includes an internal stator provided with a central opening. A generally cylindrical cooling assembly is mounted inside the central opening via a first key and keyway arrangement. The cylindrical cooling assembly is mounted to the casing of the electric machine via a second key and keyway arrangement.

12 Claims, 4 Drawing Sheets

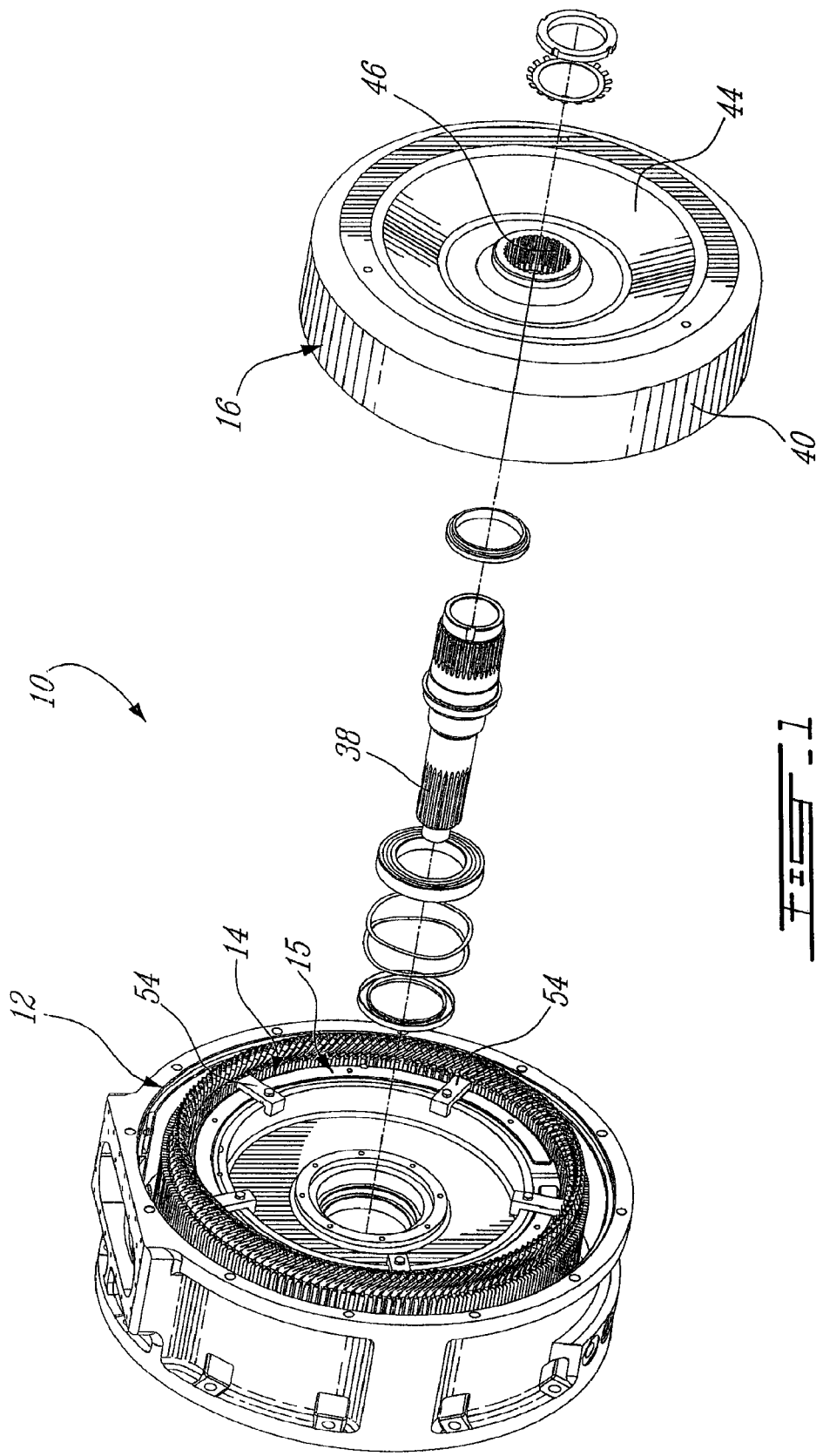

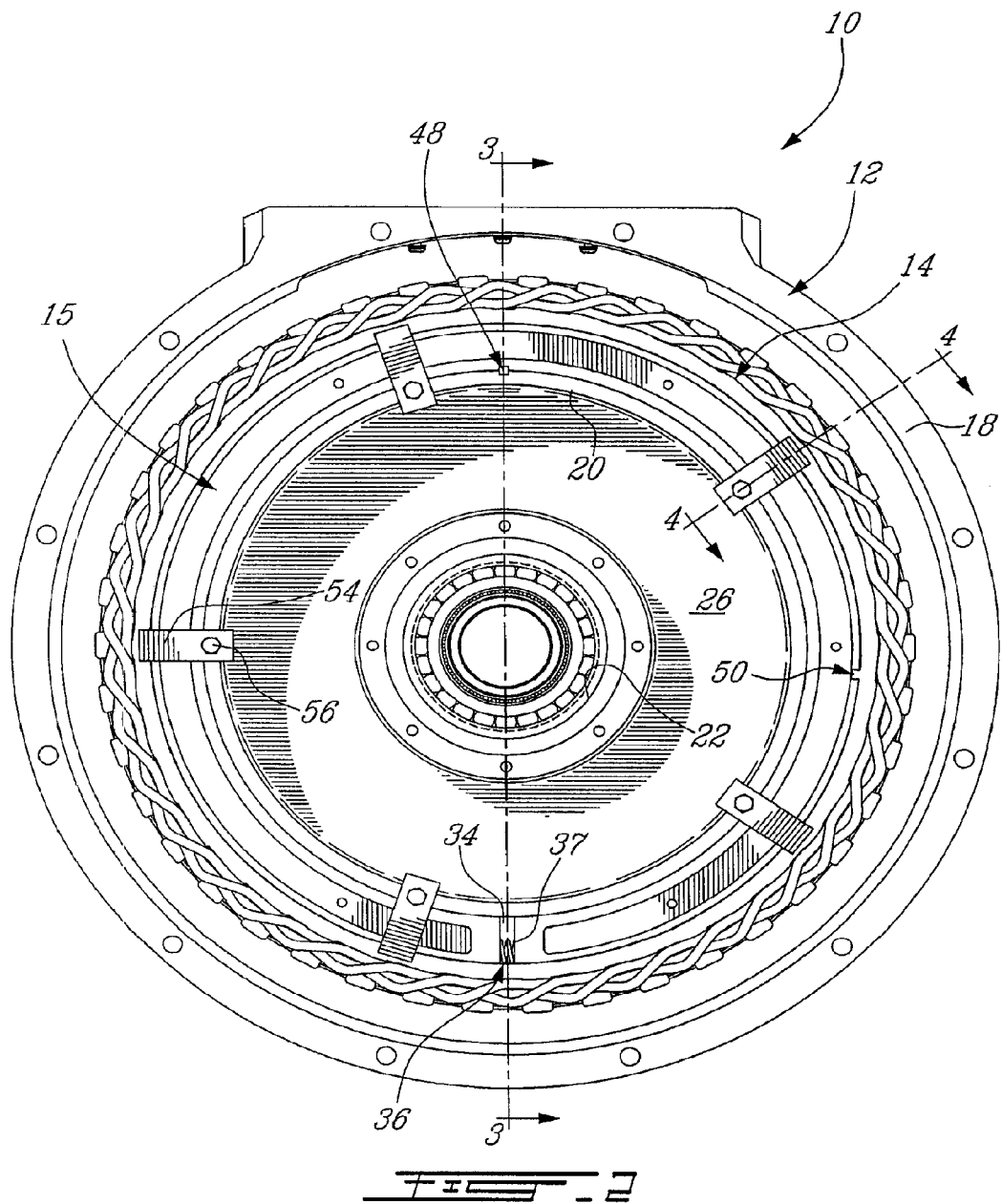

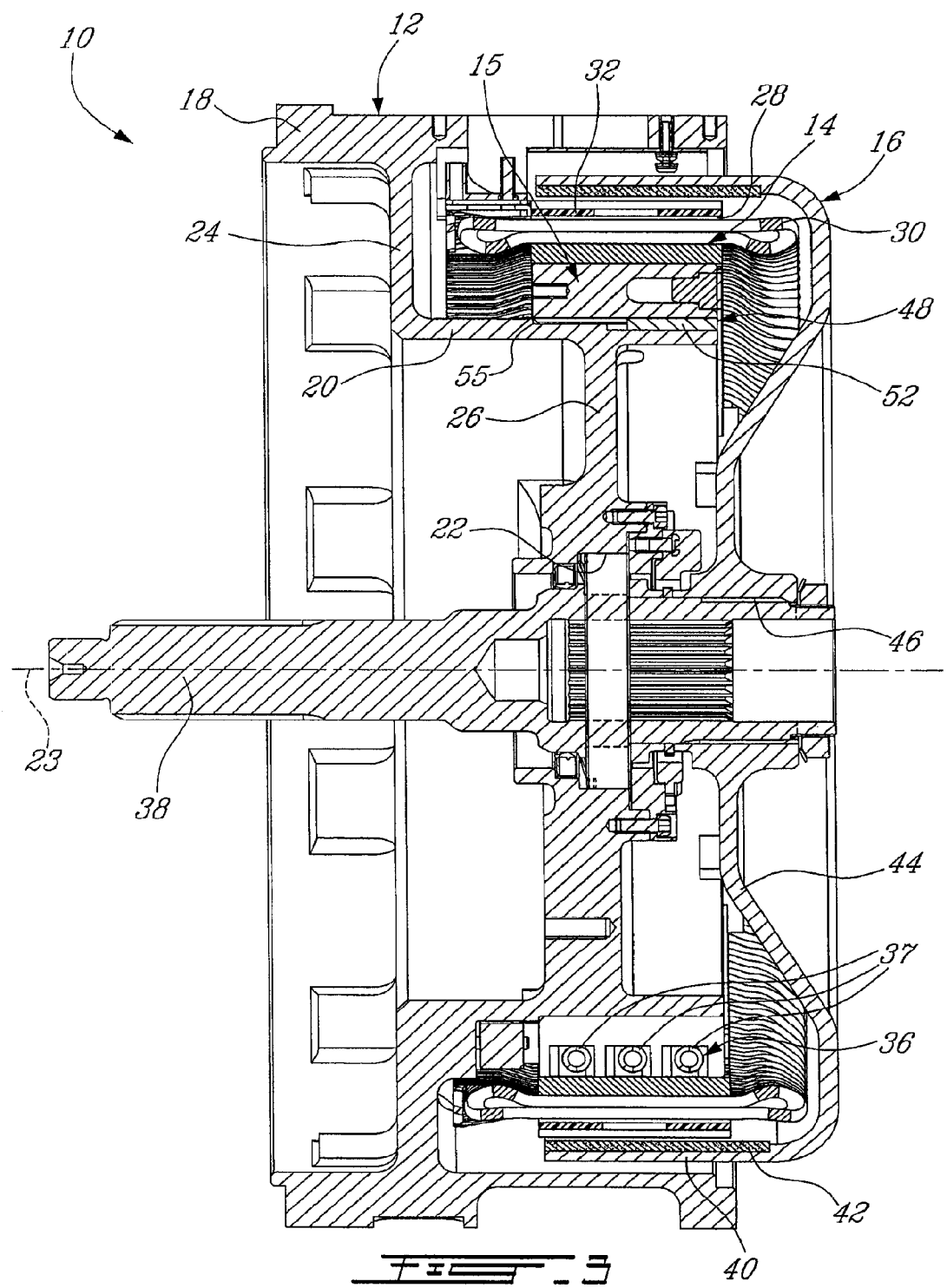
FIG_3

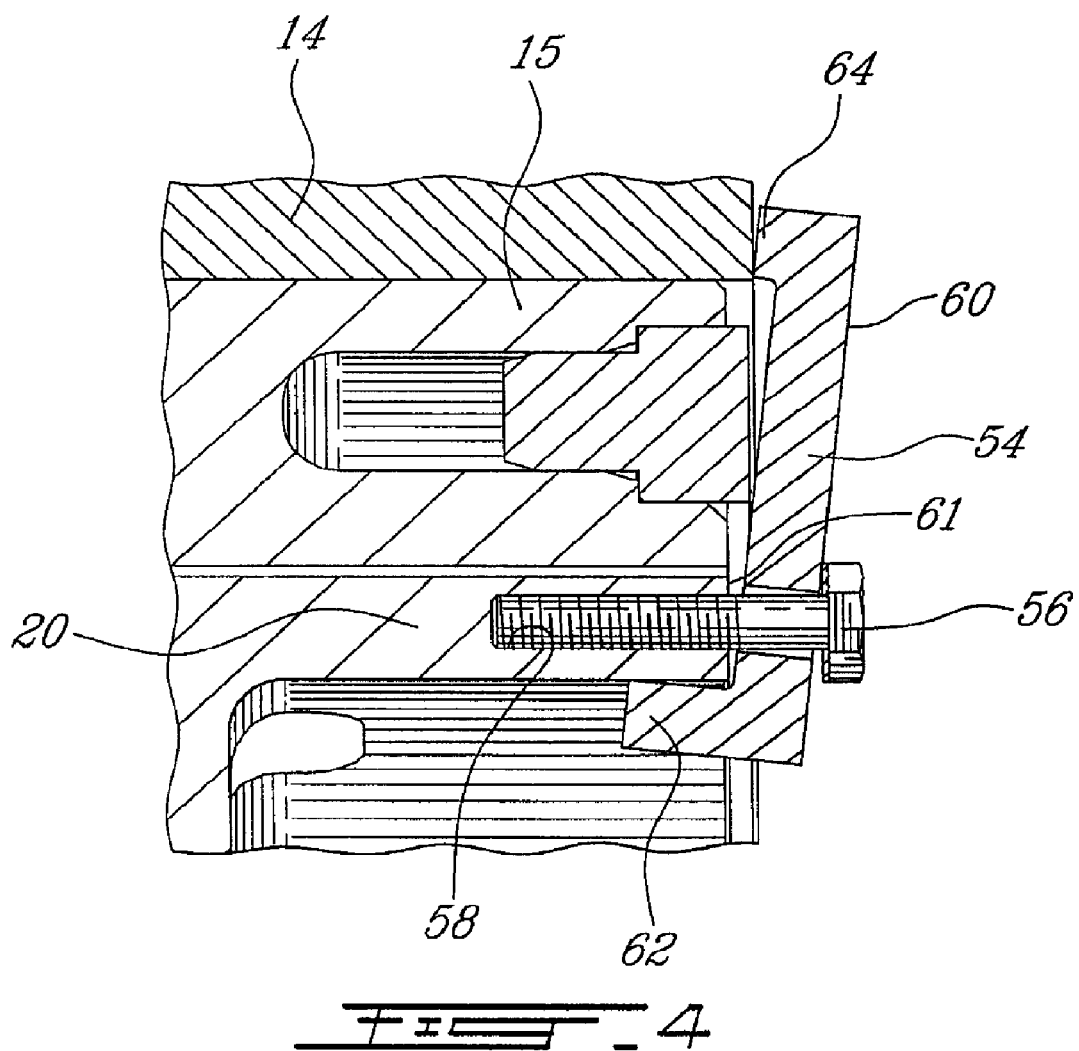
FIG_4

US 7,471,023 B2

ELECTRIC MACHINE PROVIDED WITH AN INTERNAL STATOR

CROSS-RFFERENCE TO RELATED APPLICATION

This application claims priority to U.S. Provisional Patent Application Ser. No. 60/706,781, filed Aug. 10, 2005.

FIELD OF THE INVENTION

The present invention relates to electric machines. More specifically, the present invention is concerned with an internal stator electric machine provided with a securing arrangement to mount the internal stator to the casing of the machine.

BACKGROUND OF THE INVENTION

Electric machines are well known in the art. They usually are provided with a fixed stator and a rotating rotor. Generally, the stator is external and the rotor is rotatably mounted inside the stator, coaxially therewith.

In some electric machines, the stator is internal and the cylindrical rotor is coaxially mounted outside the stator. These machines will be referred herein as internal stator electric machines.

To mount the stator of such an internal stator electric machine to the casing of the machine, conventional fasteners passing through openings in the laminations of the stator are often used. However, since heat is mainly generated in the internal stator, dilatation may induce undesirable stress on these fasteners and on other elements of the electric machine. Furthermore, the use of conventional fasteners for this task implies that the casing of the machine is so designed as to include a wall adjacent to the stator to allow the fastener therein, which limits the design of the machine's casing.

OBJECTS OF THE INVENTION

An object of the present invention is therefore to provide an improved internal stator electric machine.

SUMMARY OF THE INVENTION

More specifically, in accordance with the present invention, there is provided an electric machine comprising:

a casing provided with a generally cylindrical inner wall and defining a rotation axis;

a generally cylindrical cooling assembly mounted to the generally cylindrical inner wall; a first rotation preventing arrangement being provided between the inner wall and the cooling assembly to prevent rotation therebetween;

a stator mounted to the cooling assembly;

a longitudinal movement preventing assembly mounted to both the casing and at least one of the cooling assembly and the stator to prevent longitudinal movements therebetween; and a rotor so mounted to the casing as to be rotatable about the rotation axis.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1 is an exploded perspective view of an electric machine provided with a securing arrangement to mount the internal stator to the casing of the machine according to an embodiment of the present invention;

FIG. 2 is a front elevation of the stator of the electric machine of FIG. 1 mounted to the casing of the machine, the rotor being absent from this figure for clarity purpose;

FIG. 3 is a side sectional view taken along line 3-3 of FIG. 2; and

FIG. 4 is a side sectional view taken along line 4-4 of FIG. 2.

DETAILED DESCRIPTION

Generally stated, the present invention proposes to provide an electric machine provided with an internal stator provided with a central opening configured to receive a generally cylindrical cooling assembly therein. The stator assembly is secured to the cooling assembly. The cylindrical cooling assembly is mounted to the casing of the electric machine and a rotation preventing arrangement, for example in the form of a key and keyway arrangement, is used to prevent rotation therebetween.

Turning now to the appended figures, an electric machine 10 will be described. The electric machine 10 includes a casing 12, a stator 14, a cooling assembly 15 and a rotor 16.

As can be better seen from FIG. 3, the integral casing 12 includes an external wall 18, an internal wall 20 and a central opening 22. The internal wall 20 is connected to the external wall 18 via a first intermediate wall 24 and the central opening 22 is done in a second intermediate wall 26 integral with the internal wall 20. The central opening 22 defining a machine rotation axis 23.

The stator 14 includes a plurality of laminations (not shown) that are conventionally stacked to yield a stator having the desired length along the notation axis 23. These laminations are conventionally provided with slots 28 allowing stator coils 30 to be inserted therein. Wedges 32 are provided to maintain the coils 30 in the slots 28.

One skilled in the art will easily understand that other stator configurations are possible.

The cooling assembly 15 in interposed between the internal wall 20 and the stator 14 as will be described hereinbelow. The function of the cooling assembly 15 is to remove the heat generated by the stator 14 from the electric machine 10. A more detailed description of a cooling assembly that could be used as the cooling assembly 15 may be found in U.S. Pat. No. 6,813,016 issued on Nov. 16, 2004 and entitled "Liquid cooling arrangement for electric machines". This document is incorporated herein by reference.

As can be better seen from FIG. 2, the cooling assembly 15 includes a gap 34 provided with a biasing assembly 36 that forces the external surface of the cooling assembly 15 against the internal surface of the stator 14 to yield an adequate heat transfer between these two elements. The appended figures illustrate a biasing assembly 36 including three compression springs 37 mounted in the gap 34. Of course, other types of biasing assemblies could be used. For example, some of the biasing assemblies described in U.S. patent application Ser. No. 10/726,397 filed on Dec. 2, 2003 and entitled "Cooling device including a biasing element" could be used herein as the biasing assembly 36. This document is incorporated herein by reference.

The rotor 16 is so configured and sized as to be mounted to the electric machine 10 via a central shaft 38 that is rotatably received in the central opening 22 to allow rotation of the rotor 16 about the machine rotation axis 23. The rotor is generally bowl shaped and includes a peripheral wall 40 having an internal surface onto which permanent magnets 42 are mounted. A shaped wall 44 provided with a central aperture 46 is integral with the peripheral wall 40.

Returning to FIG. 2 of the appended drawings, a securing arrangement used to mount the stator to the casing 12 of the electric machine 10 will be described.

To secure the cooling assembly 15 to the internal wall 20 of the casing 12, a first key and keyway arrangement 48 is provided. More specifically, a first keyway is provided on the outer surface the external wall 20 and a second keyway is provided on the inner surface of the cooling assembly 15. A suitably sized key 52 (see FIG. 3) is inserted in these two keyways when they are placed in register. Rotation of the cooling assembly 15 with respect to the internal wall 20 is therefore prevented.

As mentioned hereinabove, the cooling assembly 15 is mounted to the stator 14 via the biasing assembly 36. More specifically, the external surface of the cooling assembly 15 is biased against the internal surface of the stator 14 by the biasing assembly 36.

To prevent rotation of the stator 14 with respect to the cooling assembly 15, a second key and keyway arrangement 50 is provided. More specifically, a first keyway is provided on the outer surface of the cooling assembly 15 and a key is integral with the inner surface of the laminations of the stator 14. Of course, alternatively, the inner surface of the laminations of the stator 14 could be provided with a keyway (not shown) and a separate key (not shown) could be used to interconnect the keyways.

To prevent longitudinal movements of the cooling assembly/stator with respect to the internal wall 20, a longitudinal movement preventing assembly including, for example, five brackets 54 is provided, as can be seen from FIG. 2. Each of the five brackets 54 is mounted to the exposed axial end of the internal wall 20 via a fastener 56.

More specifically, as can be better seen from FIG. 4, the fastener 56 is threaded in a threaded aperture 58 of the exposed axial end 61 of the wall 20. The bracket 54 includes a main portion 60 and two legs 62 and 64. Leg 62 is so designed as to hook the wall 20 while the leg 64 is designed to apply pressure onto the stator 14. Longitudinal movements of the cooling assembly/stator with respect to the internal wall 20 are therefore prevented.

Returning to FIG. 3, the corner 55 of one of the keyway of the intermediate wall 20 is such that longitudinal movement of the cooling assembly/stator away from the brackets 54 is prevented.

The longitudinal movement of the cooling assembly/stator is therefore prevented without having to mechanically fasten the stator directly to the casing. The brackets 54, since they are not fastened to the cooling assembly/stator allow the potential expansion of the stator 14 caused by heat. Furthermore, no fastening apertures are required in the laminations, which may increase the power density of the electric machine 10.

The use of the key and keyway arrangements also allows the cooling assembly to follow the expansion and contraction of the stator without radial restriction, therefore minimizing potential loss of contact between the cooling assembly and the stator.

One skilled in the art will easily understand that the number, shape and position of brackets can be modified depending on the configuration of the electric machine and/or other requirements. Furthermore, other means could be provided to prevent movements between the cooling assembly/stator with respect to the casing. Similarly, more that one first and/or second key and keyway arrangement could be used.

It is also to be noted that the key and keyway arrangement 50 could be omitted should the biasing assembly 36, or its equivalent, be secure enough to prevent rotation between the stator 14 and the cooling assembly 15.

It is also to be noted that other elements are necessary for the adequate operation of the electric machine 10. However, these elements have not been shown and/or described herein since they are not believed relevant to the present invention.

Although the present invention has been described hereinabove by way of preferred embodiments thereof, it can be modified, without departing from the spirit and nature of the subject invention as defined in the appended claims.

What is claimed is:

1. An electric machine comprising:
   a casing provided with a generally cylindrical inner wall and defining a rotation axis;
   a generally cylindrical cooling assembly mounted to the generally cylindrical inner wall; a first rotation preventing arrangement being provided between the inner wall and the cooling assembly to prevent rotation therebetween;
   a stator mounted to the cooling assembly;
   a longitudinal movement preventing assembly mounted to both the casing and at least one of the cooling assembly and the stator to prevent longitudinal movements therebetween; and
   a rotor so mounted to the casing as to be rotatable about the rotation axis.

2. An electric machine as recited in claim 1, wherein the first rotation preventing arrangement includes a key and keyway arrangement provided between the cooling assembly and the inner wall of the casing.

3. An electric machine as recited in claim 2, wherein the key and keyway arrangement includes a first keyway provided in the cooling assembly, a second keyway provided in the inner wall of the casing and a key configured and sized as to enter the first and second keyways.

4. An electric machine as recited in claim 1, wherein the generally cylindrical cooling assembly including an external surface and being provided with a gap provided with a biasing assembly; the stator being provided with a generally cylindrical inner surface configured and sized as to be mounted to the external surface of the cooling assembly; the biasing assembly being so mounted to the cooling assembly as to selectively force the external surface of the cooling assembly against the internal surface of the stator.

5. An electric machine as recited in claim 4, wherein the biasing assembly includes three compression springs mounted in the gap of the cooling assembly.

6. An electric machine as recited in claim 1, further comprising a second rotation preventing arrangement being provided between the cooling assembly and the stator to prevent rotation therebetween.

7. An electric machine as recited in claim 6, wherein the second rotation preventing arrangement includes a key and keyway arrangement provided between the cooling assembly and the stator.

8. An electric machine as recited in claim 7, wherein the key and keyway arrangement includes a keyway provided in the cooling assembly and a key integral with the stator; the key being configured and sized as to enter the keyway.

9. An electric machine as recited in claim 1, wherein the generally cylindrical inner wall is provided with an axial end and wherein the longitudinal movement preventing assembly includes at least one bracket mounted to the axial end of the inner wall, the at least one bracket contacting at least one of the cooling assembly and the stator to prevent longitudinal movement therebetween.

10. An electric machine as recited in claim 9, wherein the axial end of the generally cylindrical inner wall is provided with a threaded aperture and wherein the bracket is mounted to the threaded aperture via a fastener.

11. An electric machine as recited in claim 10, wherein the at least one bracket includes a main portion and first and second legs; the main portion including an aperture allowing the fastener therethrough; the first leg being so configured and sized as to hook the inner wall and the second leg being so configured and sized as to apply pressure onto the stator.

12. An electric machine as recited in claim 9, wherein the at least one bracket includes five brackets.

* * * * *